US009802392B2

(12) United States Patent
Lee et al.

(10) Patent No.: US 9,802,392 B2
(45) Date of Patent: *Oct. 31, 2017

(54) MICROTEXTURED MULTILAYERED ELASTIC LAMINATES WITH ENHANCED STRENGTH AND ELASTICITY AND METHODS OF MAKING THEREOF

(71) Applicant: Kimberly-Clark Worldwide, Inc., Neenah, WI (US)

(72) Inventors: WanDuk Lee, Appleton, WI (US); Peiguang Zhou, Appleton, WI (US); Davis-Dang Hoang Nhan, Appleton, WI (US); Alphonse Carl DeMarco, Greenville, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 402 days.

This patent is subject to a terminal disclaimer.

(21) Appl. No.: 14/230,741

(22) Filed: Mar. 31, 2014

(65) Prior Publication Data
US 2015/0273802 A1    Oct. 1, 2015

(51) Int. Cl.
  *B32B 27/08* (2006.01)
  *B32B 7/02* (2006.01)
  (Continued)

(52) U.S. Cl.
  CPC .......... *B32B 27/08* (2013.01); *B29C 47/0057* (2013.01); *B29C 47/065* (2013.01);
  (Continued)

(58) Field of Classification Search
  CPC ....... B32B 27/08; B32B 27/18; B32B 27/302; B32B 27/32; B32B 27/36; B32B 7/02; B32B 2274/00; B32B 2307/51; B32B 2307/702; B32B 2307/704; B32B 2307/7244; B29D 7/01; B29C 47/0021;
  (Continued)

(56) References Cited

U.S. PATENT DOCUMENTS 2,531,396 A    11/1950 Carter
2,957,512 A    10/1960 Wade et al.
(Continued)

FOREIGN PATENT DOCUMENTS

EP    0187726 A2    7/1986
EP    0556749 A1    8/1993
(Continued)

OTHER PUBLICATIONS

Non-final Office action issued for U.S. Appl. No. 14/134,755 (dated Nov. 24, 2014).
(Continued)

*Primary Examiner* — Frances Tischler
(74) *Attorney, Agent, or Firm* — Armstrong Teasdale LLP (57) ABSTRACT

Stronger elastic laminates having an improved microtextured appearance, as well as methods of preparing the laminates, are disclosed herein. Particularly, the present disclosure is directed to multilayered elastic laminates including at least one thermoplastic elastomeric film layer and at least one plastic layer coextruded together, stretched and then relaxed. The prepared laminates have enhanced overall strength and elasticity.

20 Claims, 1 Drawing Sheet

— Elastic layer alone
— Elastic laminate with LLDPE layer
--- 300% prestretched elastic laminate with LLDPE layer
-- 400% prestretched elastic laminate with LLDPE layer (51) Int. Cl.
*B32B 25/08* (2006.01)
*B32B 25/14* (2006.01)
*B32B 27/18* (2006.01)
*B32B 27/30* (2006.01)
*B32B 27/32* (2006.01)
*B32B 27/36* (2006.01)
*B29C 47/06* (2006.01)
*B29C 47/00* (2006.01)
*B29K 9/06* (2006.01)
*B32B 37/14* (2006.01)

(52) U.S. Cl.
CPC ............... *B32B 7/02* (2013.01); *B32B 25/08* (2013.01); *B32B 25/14* (2013.01); *B32B 27/18* (2013.01); *B32B 27/302* (2013.01); *B32B 27/32* (2013.01); *B32B 27/36* (2013.01); *B29C 47/0021* (2013.01); *B29K 2009/06* (2013.01); *B32B 37/144* (2013.01); *B32B 2274/00* (2013.01); *B32B 2307/51* (2013.01); *B32B 2307/702* (2013.01); *B32B 2307/704* (2013.01); *B32B 2307/7244* (2013.01); *B32B 2555/00* (2013.01); *Y10T 428/31797* (2015.04); *Y10T 428/31913* (2015.04); *Y10T 428/31931* (2015.04); *Y10T 428/31938* (2015.04)

(58) Field of Classification Search
CPC ......... B29K 2009/06; Y10T 428/31797; Y10T 428/31913; Y10T 428/31931; Y10T 428/31938
USPC ............. 428/483, 516, 521, 523; 264/173.16
See application file for complete search history.

(56) References Cited

U.S. PATENT DOCUMENTS

| | | |
|---|---|---|
| 3,953,638 A | 4/1976 | Kemp |
| 4,081,502 A | 3/1978 | Blumel et al. |
| 4,197,377 A | 4/1980 | Bohm et al. |
| 4,259,220 A | 3/1981 | Bunnelle et al. |
| 4,375,448 A | 3/1983 | Appel et al. |
| 4,494,278 A | 1/1985 | Kroyer et al. |
| 4,514,345 A | 4/1985 | Johnson et al. |
| 4,525,407 A | 6/1985 | Ness |
| 4,528,239 A | 7/1985 | Trokhan |
| 4,606,964 A | 8/1986 | Wideman |
| 4,640,810 A | 2/1987 | Laursen et al. |
| 4,652,487 A | 3/1987 | Morman |
| 4,657,802 A | 4/1987 | Morman |
| 4,663,220 A | 5/1987 | Wisneski et al. |
| 4,789,699 A | 12/1988 | Kieffer et al. |
| 4,880,682 A | 11/1989 | Hazelton et al. |
| 4,939,016 A | 7/1990 | Radwanski et al. |
| 5,098,522 A | 3/1992 | Smurkoski et al. |
| 5,260,171 A | 11/1993 | Smurkoski et al. |
| 5,275,700 A | 1/1994 | Trokhan |
| 5,328,565 A | 7/1994 | Rasch et al. |
| 5,334,289 A | 8/1994 | Trokhan et al. |
| 5,334,446 A | 8/1994 | Quantrille et al. |
| 5,344,691 A | 9/1994 | Hanschen et al. |
| 5,354,597 A | 10/1994 | Capik et al. |
| 5,376,430 A | 12/1994 | Swenson et al. |
| 5,389,202 A | 2/1995 | Everhart et al. |
| 5,431,786 A | 7/1995 | Rasch et al. |
| 5,496,624 A | 3/1996 | Stelljes, Jr. et al. |
| 5,500,277 A | 3/1996 | Trokhan et al. |
| 5,514,523 A | 5/1996 | Trokhan et al. |
| 5,527,171 A | 6/1996 | Soerensen |
| 5,554,467 A | 9/1996 | Trokhan et al. |
| 5,566,724 A | 10/1996 | Trokhan et al. |
| 5,624,790 A | 4/1997 | Trokhan et al. |
| 5,628,741 A | 5/1997 | Buell et al. |
| 5,628,876 A | 5/1997 | Ayers et al. |
| 5,733,617 A | 3/1998 | Baduel |
| 5,800,903 A | 9/1998 | Wood et al. |
| 5,804,021 A | 9/1998 | Abuto et al. |
| 5,814,413 A | 9/1998 | Beerwart |
| 5,861,074 A | 1/1999 | Wu |
| 5,882,769 A | 3/1999 | McCormack et al. |
| 5,885,908 A | 3/1999 | Jaeger et al. |
| H1798 H | 7/1999 | Modic |
| H1808 H | 10/1999 | Djiauw et al. |
| 6,057,024 A | 5/2000 | Mleziva et al. |
| 6,258,196 B1 | 7/2001 | Suzuki et al. |
| 6,372,067 B1 | 4/2002 | Kobayashi et al. |
| 6,384,123 B1 | 5/2002 | Young |
| 6,436,529 B1 | 8/2002 | Deeb et al. |
| 6,481,483 B1 | 11/2002 | Kobayashi et al. |
| H2096 H | 1/2004 | Erderly et al. |
| 6,682,803 B2 | 1/2004 | McCormack et al. |
| 6,794,024 B1 | 9/2004 | Walton et al. |
| 7,078,089 B2 | 7/2006 | Ellis et al. |
| 7,291,382 B2 | 11/2007 | Krueger et al. |
| 7,449,240 B2 * | 11/2008 | Hamulski ............. B29C 55/023 428/411.1 |
| 7,498,282 B2 | 3/2009 | Patel et al. |
| 7,799,418 B2 | 9/2010 | Champion |
| 7,807,593 B2 | 10/2010 | Patel et al. |
| 7,834,236 B2 | 11/2010 | Middlesworth et al. |
| 7,879,452 B2 | 2/2011 | Muslet |
| 7,910,658 B2 | 3/2011 | Chang et al. |
| 7,922,854 B2 | 4/2011 | Sabbagh et al. |
| 8,034,440 B2 | 10/2011 | Morman et al. |
| 8,167,490 B2 | 5/2012 | Hu et al. |
| 8,168,853 B2 | 5/2012 | Autran et al. |
| 2002/0016122 A1 | 2/2002 | Curro et al. |
| 2002/0088534 A1 | 7/2002 | Kobayashi et al. |
| 2002/0187304 A1 | 12/2002 | McCormack et al. |
| 2003/0017345 A1 | 1/2003 | Middlesworth et al. |
| 2003/0124309 A1 | 7/2003 | Hamulski et al. |
| 2004/0087235 A1 | 5/2004 | Morman et al. |
| 2004/0089412 A1 | 5/2004 | Topolkaraev |
| 2004/0121683 A1 | 6/2004 | Jordan et al. |
| 2004/0122408 A1 | 6/2004 | Potnis et al. |
| 2004/0122409 A1 | 6/2004 | Thomas et al. |
| 2005/0043460 A1 | 2/2005 | McCormack et al. |
| 2005/0049566 A1 | 3/2005 | Vukos et al. |
| 2005/0148730 A1 | 7/2005 | Day et al. |
| 2005/0148732 A1 | 7/2005 | Thomas et al. |
| 2005/0282028 A1 | 12/2005 | Huber |
| 2006/0062980 A1 | 3/2006 | Iyer |
| 2006/0135024 A1 | 6/2006 | Thomas et al. |
| 2006/0216473 A1 | 9/2006 | Tomany et al. |
| 2006/0286386 A1 | 12/2006 | Sabbagh et al. |
| 2007/0049888 A1 | 3/2007 | Soerens et al. |
| 2007/0078222 A1 | 4/2007 | Chang et al. |
| 2007/0092704 A1 | 4/2007 | Patel et al. |
| 2007/0141303 A1 | 6/2007 | Steindorf |
| 2007/0141352 A1 | 6/2007 | Calhoun et al. |
| 2007/0155900 A1 | 7/2007 | Chang et al. |
| 2007/0254176 A1 | 11/2007 | Patel et al. |
| 2007/0298262 A1 | 12/2007 | Quiram et al. |
| 2008/0003910 A1 | 1/2008 | Hughes |
| 2008/0132866 A1 | 6/2008 | Siqueira et al. |
| 2008/0145670 A1 | 6/2008 | Song et al. |
| 2008/0177242 A1 | 7/2008 | Chang |
| 2008/0207071 A1 | 8/2008 | Muslet et al. |
| 2008/0314535 A1 | 12/2008 | Hilbig et al. |
| 2009/0163361 A1 | 6/2009 | Handlin et al. |
| 2009/0258210 A1 | 10/2009 | Iyad et al. |
| 2010/0008958 A1 | 1/2010 | Mundschau et al. |
| 2010/0081353 A1 | 4/2010 | Sabbagh et al. |
| 2010/0267882 A1 | 10/2010 | Clunk et al. |
| 2011/0160687 A1 | 6/2011 | Welch et al. |
| 2012/0238162 A1 | 9/2012 | Muslet et al. |

(56) References Cited

U.S. PATENT DOCUMENTS

| | | |
|---|---|---|
| 2012/0277703 A1 | 11/2012 | Rhein et al. |
| 2012/0291949 A1 | 11/2012 | Thomas et al. |
| 2013/0048204 A1 | 2/2013 | Chang et al. |

FOREIGN PATENT DOCUMENTS

| | | |
|---|---|---|
| EP | 0685586 A2 | 12/1995 |
| EP | 0682678 B1 | 12/1998 |
| JP | 8188950 A | 7/1996 |
| KR | 100918290 B1 | 9/2009 |
| KR | 1020110076494 A | 7/2011 |
| KR | 1020120116160 A | 10/2012 |
| WO | 9418263 A | 8/1994 |
| WO | 9829239 A1 | 7/1998 |
| WO | 9925912 A1 | 5/1999 |
| WO | 0132116 A1 | 5/2001 |
| WO | 2015095731 A1 | 6/2015 |
| WO | 2015095749 A1 | 6/2015 |

OTHER PUBLICATIONS

International Search Report and Written Opinion issued for PCT/IB2015/055914 (dated Oct. 27, 2015), 9 pages.
International Search Report and Written Opinion for PCT/IB2015/051661 (dated May 28, 2015).
International Search Report and Written Opinion for PCT/IB2014/066729 (dated Apr. 8, 2015).
International Search Report and Written Opinion for PCT/IB2014/066731 (dated Apr. 14, 2015).
European Search Report for EP 14 87 2876, dated Apr. 12, 2017, 5 pgs.
Wikipedia: "Pixel", retrieved from the Internet: URL https://fr.wikipedia.org/wiki/Pixel on Aug. 15, 2017, 3 pages.
European Search Report for EP 14 87 7244, dated Aug. 25, 2017, 18 pgs.

\* cited by examiner

MICROTEXTURED MULTILAYERED ELASTIC LAMINATES WITH ENHANCED STRENGTH AND ELASTICITY AND METHODS OF MAKING THEREOF

FIELD OF DISCLOSURE

The present disclosure is directed to stronger elastic laminates having an improved microtextured appearance. Particularly, the present disclosure is directed to multilayered elastic laminates including at least one thermoplastic elastomeric film layer and at least one plastic layer. The layers are coextruded together, stretched and then relaxed, providing the resulting elastic laminates with enhanced overall strength and elasticity, as well as a microtexture of the surface that is more pleasing to the consumer. The thermoplastic elastomeric film layer of the laminates includes a combination of polyolefin-based thermoplastic elastomers, styrenic block copolymers, and inorganic clay, and the plastic layer includes semi-crystalline or amorphous polymers. In some embodiments, the elastomeric film layers are suitably free of calcium carbonate.

Elastic laminates have conventionally been used to provide comfort and sufficient sealing functions in personal care products. For example, elastic laminates are used in side panels, ear attachments, and waist bands in diapers and training pants. In today's market, the elastic laminates are based on an elastic polymer laminated with a non-woven material as facing. These non-woven facing materials enhance the laminates' mechanical strength as elastic films are not alone typically strong enough to prevent breaking in case of overstretching the laminate by the consumer. The materials additionally prevent elastic film blocking during high speed processing. Further, the non-woven facing materials, made from synthetic polymer e.g., polypropylene, polyethylene, or other polyolefins, provide improved cloth-like appearance of the laminate.

A stronger elastomeric film for use in an elastic laminate would thus shift the strength burden away from the facing materials. More particularly, there is a need in the art to prepare elastic laminates having increased overall strength and elasticity that allow for a shift in strain-stress curves to a lower strain region. It would further be beneficial if the elastic laminates could be prepared such to have a microtextured, cloth-like appearance similar to conventional non-woven/elastic laminates. Accordingly, the present disclosure is directed to elastic laminates including multiple elastic and plastic layers. The laminates have increased strength and elasticity, while providing the softer cloth-like appearance at a lower cost as compared to current elastic material with non-woven facing.

BRIEF DESCRIPTION OF THE DISCLOSURE

Multilayered elastic laminates having an improved mechanical strength, enhanced elasticity, and cloth-like appearance are disclosed. The laminates include at least a first thermoplastic elastomeric film layer affixed to at least a first plastic layer. In particularly suitable embodiments, the first thermoplastic elastomeric film layer is sandwiched between two plastic layers. In other suitable embodiments, a first plastic layer is sandwiched between two thermoplastic elastomeric films. The elastomeric film layer has an elasticity that is greater than the elasticity of the plastic layer, in other words, permanent set of the elastomeric film layer is less than the permanent set of the plastic layer. The laminates are prepared by coextruding the elastomeric film layer and plastic layer, and then stretching the laminate followed by relaxing to give the laminate desired surface features and physical properties.

The plastic layer of the laminate provides increased overall strength to the elastic laminate. Further, it has been surprisingly found that by stretching and relaxing the elastic laminate, a wrinkled microtextured surface is generated that, in some embodiments, provides a silky feel to the consumer without the use of nonwoven facing materials. In addition, the mechanical properties of the laminate are dramatically improved by stretching and relaxation of the laminate as compared to the elastic laminate prior to stretching. These advantageous mechanical properties are the result of the plastic layer being elongated during initial stretching and then corrugated by relaxation of the thermoplastic elastomeric film. When the laminate, including the corrugated plastic layer, is elongated again, until the strain level of initial stretching, such as during use of the laminate, the corrugated plastic layer would just flattened and does not likely contribute to the tensile properties of the elastic laminate. That is, the tensile properties of the laminate until the strain level of initial stretching is mainly dominated by the elastomeric layer, so that the laminates would keep low stress value with elongation and less permanent set after elongation, which is less than initial stretching strain. Once elongated further than initial stretching strain level of the plastic layer, stress becomes dramatically increased due to the fully flattened plastic layer, as well as the molecular orientation of the plastic layer, which results in shifting of the stress-strain curve to less elongation with 50-100% higher strength at break as compared to the thermoplastic elastomeric film alone.

It has further been found that by manipulating the polymers used, the thickness of the plastic layers, varying the initial stretching ratio, physical behaviors such as strength and elasticity of the laminate and microtextured appearance can be controlled to enable a sufficient, and even desirable, design of elastic laminate for the specific desired end use product.

Accordingly, in one aspect, the present disclosure is directed to an elastic laminate. The laminate comprises: a first thermoplastic elastomeric film layer having a permanent set of less than 40% after 150% elongation, the thermoplastic elastomeric film comprising a polyolefin-based thermoplastic elastomer and a styrenic block copolymer; and a first plastic layer affixed to a first surface of the thermoplastic elastomeric film layer, the plastic layer having a permanent set greater than the permanent set of the elastomeric film layer, and wherein the plastic layer comprises one of a semi-crystalline and amorphous polymer. In an exemplary embodiment, the first thermoplastic elastomeric film has a permanent set after 150% elongation of less than 40%, and the first plastic layer has a permanent set after 150% elongation of greater than 50%.

In another aspect, the present disclosure is directed to a method for preparing an elastic laminate. The method comprises: coextruding a first thermoplastic elastomeric film layer with a first plastic layer to prepare an elastic laminate, the first thermoplastic elastomeric film layer having a permanent set of less than 40% after 150% elongation, the thermoplastic elastomeric film comprising a polyolefin-based thermoplastic elastomer, a styrenic block copolymer, and a strength enhancing agent, the plastic layer having a permanent set greater than the permanent set of the elastomeric film layer, and wherein the plastic layer comprises one of a semi-crystalline or amorphous polymer; stretching the elastic laminate in one or both of the machine direction or cross direction; and relaxing the stretched elastic laminate.

DETAILED DESCRIPTION

Definitions

As used herein, the terms "polymer" and "polymeric" generally include but are not limited to, homopolymers, copolymers, such as for example, block, graft, random and alternating copolymers, terpolymers, etc. and blends and modifications thereof. Furthermore, unless otherwise specifically limited, the term "polymer" includes all possible spatial configurations of the molecule. These configurations include, but are not limited to isotactic, syndiotactic and random symmetries.

As used herein, the term "non-woven material" refers to a material made from synthetic polymeric fibers such as fibers of synthetic polyolefins (e.g., polypropylene, polyethylene, polybutene, and copolymers with carbons up to C12, and the like), and/or natural fibers such as cellulosic fibers, bonded together by chemical, mechanical, heat, or solvent treatment. The "non-woven material" also has a structure of individual fibers or threads which are interlaid, but not in an identifiable manner as in a knitted fabric. The "non-woven material" has been formed from many processes, such as, for example, meltblowing processes, spunbonding processes, bonded carded web processes, hydroentangling process.

As used herein, the terms "machine direction" or MD refers to the direction along the length of a fabric in the direction in which it is produced. The terms "cross machine direction," "cross direction," "cross directional," or CD refers to the direction across the width of the fabric, i.e., a direction generally perpendicular to the MD.

As used herein, the term "laminate" refers to a composite structure of two or more sheet material layers that have been adhered through a bonding step, such as through adhesive bonding, thermal bonding, point bonding, pressure bonding, extrusion coating, extrusion laminating, or ultrasonic bonding. In a particularly suitable embodiment, the layers are coextruded to form the elastic laminate.

As used herein, the term "elastomeric" and "elasticity" shall be interchangeable with the term "elastic" and refers to sheet material, which can be elongated by at least 25 percent of its relaxed length and which will recover, upon release of the applied force, at least 10 percent of its elongation. It is generally desirable that the elastomeric material or composite be capable of being elongated by at least 100 percent, more desirably by at least 300 percent, and even more desirably by at least 400 percent, of its relaxed length and recover, upon release of an applied force, at least 50 percent of its elongation.

As used herein, the term "thermoplastic" refers to a polymer which is capable of being melt processed.

As used herein, the term "breathable" refers to a material which is permeable to water vapor. The water vapor transmission rate (WVTR) or moisture vapor transfer rate (MVTR) is measured in grams per square meter per 24 hours, and shall be considered equivalent indicators of breathability. The term "breathable" desirably refers to a material which is permeable to water vapor having a minimum WVTR of desirably about 100 $g/m^2/24$ hours, more suitably, greater than about 300 $g/m^2/24$ hours, and even more suitably, greater than about 1000 $g/m^2/24$ hours.

The WVTR of a fabric, in one aspect, gives an indication of how comfortable a fabric would be to wear. Often, personal care product applications of breathable materials suitably have higher WVTRs and, more typically, exceed about 1,200 $g/m^2/24$ hours, 1,500 $g/m^2/24$ hours, 1,800 $g/m^2/24$ hours, or even exceeding 2,000 $g/m^2/24$ hours.

As used herein, the terms "impermeable" or "non-breathable" refers to any material that does not fall within the definition of "breathable" above.

As used herein, the term "set" refers to retained elongation in a material sample following the elongation and recovery, i.e., after the material has been stretched and allowed to relax during a cycle test.

As used herein, the term "permanent set" is the measure of the percent (%) amount elongation at which stress becomes zero in a stress-% elongation plot. A perfect elastic material such as a spring would have a zero permanent set since the retractive curve will pass through the origin. As used herein, permanent set is measured after 150% elongation of the material. For example, a material sample with an initial gauge length of 1 inch that is stretched to 150% elongation and relaxes back to a length of about 1.2 inches has a permanent set, as defined herein, of 20%.

These measurements are performed using a strip elongation test which is substantially in accordance with the specifications in ASTM D5459-95. Specifically, the test uses two clamps each having two jaws with each jaw having a facing in contact with the sample. The clamps hold the material in the same plane usually vertically, separated by 1 inch and move the cross head at a specific rate of extension. The sample size is 4 inches by ⅜ inches (101.6 mm by 9.525 mm) with a jaw facing height of 1 inch and width of 3 inches and at a cross-head displacement rate of 20 in/min. The specimen is clamped in a MTS (Mechanical Test Systems) electromechanical test frame which has data acquisition capability. The test is conducted at ambient condition both in cross direction and machine direction (CD & MD). Results are reported as an average of at least five specimens.

The present disclosure is directed to elastic laminates including at least one thermoplastic elastomeric film layer and at least one plastic layer. The layers are coextruded together, stretched and then relaxed, providing the resulting elastic laminates with enhanced overall strength and elasticity, and, in some embodiments, providing an improved microtexture of the outer surface. Accordingly, the elastic laminates of the present disclosure can provide for stronger, more elastic regions in personal care products such as diapers, training pants, swimwear, absorbent underpants, adult incontinence products, and feminine hygiene products, such as feminine care pads, napkins, and pantiliners.

Further advantages include improved appearance and softer feel to the consumer when the laminate includes the thermoplastic elastomeric film between outer plastic layers that have been stretched and relaxed.

Generally, the elastic laminates of the present disclosure include at least a first thermoplastic elastomeric film layer affixed to at least a first plastic layer. In some embodiments, the laminates include more than one thermoplastic elastomeric film layer and/or more than one plastic layer. For example, in some embodiments, the laminate includes a first plastic layer affixed to a first surface of a first thermoplastic elastomeric film layer and a second plastic layer affixed to a second opposite surface of the first thermoplastic elastomeric film layer such that the elastomeric film layer is sandwiched between the first and second plastic layers. In another embodiment, the laminate includes a first thermoplastic elastomeric film layer affixed to a first plastic layer and a second thermoplastic elastomeric film layer affixed to the first plastic layer opposite the first thermoplastic elastomeric film. It should be understood that more than two plastic layers and/or more than two thermoplastic elastomeric film layers, such as three, four, five, or even more plastic layers and/or thermoplastic elastomeric films can be used in the laminates without departing from the scope of the present disclosure.

The thermoplastic elastomeric film layers for use in the elastic laminates of the present disclosure have a basis weight of from about 10 gsm to about 300 gsm, including from about 20 gsm to about 150 gsm, and including from about 30 gsm to about 100 gsm.

Any of a variety of thermoplastic elastomeric polymers may be employed in the present disclosure, such as elastomeric polyesters, elastomeric polyurethanes, elastomeric polyamides, elastomeric copolymers, elastomeric polyolefins, and so forth.

In particularly suitable embodiments, the thermoplastic elastomeric film layer includes a combination of polyolefin-based thermoplastic elastomers and styrenic block copolymers.

Examples of polyolefin-based thermoplastic elastomers suitable for use in the elastomeric film layers include, among others, a crystalline polyolefin, for example, a homopolymer or a copolymer of an α-olefin having 1 to 20 carbon atoms, and including 1 to 12 carbon atoms.

Examples of crystalline polyolefins include homopolymers and copolymers described below.

(1) Ethylene homopolymer
The ethylene homopolymer may be prepared by any one of a low-pressure process and a high-pressure process.
  (2) Copolymers of ethylene and not more than 10% by mol of α-olefins other than ethylene or vinyl monomers such as vinyl acetate and ethyl acrylate; examples include ethylene octene copolymer, available as Engage 8407 or Engage 8842 (Dow Chemical, Houston, Tex.)
  (3) Propylene homopolymer; examples include polypropylene impact copolymer PP7035E4 and polypropylene random copolymer PP9574E6 (Exxon Mobil, Houston, Tex.)
  (4) Random copolymers of propylene and not more than 10% by mol of α-olefins other than propylene
  (5) Block copolymers of propylene and not more than 30% by mol of α-olefins other than propylene
  (6) 1-Butene homopolymer
  (7) Random copolymers of 1-butene and not more than 10% by mol of α-olefins other than 1-butene
  (8) 4-Methyl-1-pentene homopolymer
  (9) Random copolymers of 4-methyl-1-pentene and not more than 20% by mol of α-olefins other than 4-methyl-1-pentene Examples of the α-olefins include ethylene, propylene, 1-butene, 4-methyl-1-pentene, 1-hexene and 1-octene.

Exemplary commercially available polyolefin-based thermoplastic elastomers for use in the elastomeric film layers include VISTAMAXX™ (propylene-based elastomer, available from ExxonMobil Chemical, Houston, Tex.), INFUSE™ (olefin block copolymers, available from Dow Chemical Company, Midland, Mich.), VERSIFY™ (propylene-ethylene copolymers) such as VERSIFY™ 4200 and VERSIFY™ 4300 (Dow Chemical Company, Midland, Mich.), ENGAGE™ (ethylene octane copolymer, available from Dow Chemical, Houston, Tex.), and NOTIO 0040 and NOTIO 3560 (available from Mitsui Chemical (USA), New York, N.Y. In one particularly suitable embodiment, the polyolefin-based thermoplastic elastomer is VISTAMAXX™ 6102FL.

In an alternative embodiment, the thermoplastic elastomer may be thermoplastic ester/ether elastomers or thermoplastic polyurethanes, including PEBAX® block amide elastomers (commercially available from Arkema, France).

The thermoplastic elastomeric film layers generally include greater than 50% by weight thermoplastic elastomer, and in particular greater than 50% by weight thermoplastic polyolefin elastomer, including greater than 55% by weight, including greater than 60% by weight, including greater than 65% by weight, including greater than 70% by weight, including greater than 75%, and including greater than 80% by weight thermoplastic elastomer. In suitable embodiments, the thermoplastic elastomeric film layer includes 50% by weight thermoplastic elastomer. In yet other suitable embodiments, the thermoplastic elastomeric film layer includes about 62% by weight thermoplastic elastomer. In yet other suitable embodiments, the thermoplastic elastomeric film layer includes about 65% by weight thermoplastic elastomer. In still other suitable embodiments, the thermoplastic elastomeric film layer includes about 82% by weight, or even about 83% by weight, thermoplastic elastomer.

When the thermoplastic elastomeric film layer includes thermoplastic polyolefin elastomers, the thermoplastic elastomeric film layer may additionally include a styrenic block copolymer. It has unexpectedly been found that the addition of styrenic block copolymers provides improved mechanical strength to the film. Based on these improved functional and structural characteristics, the thermoplastic elastomeric film layers allow for personal care products such as disposable diapers, training pants, and the like, to be made to have improved comfort, strength and sealing functions. More particularly, in some embodiments, the thermoplastic elastomeric film layers with improved mechanical strength allow for reduced basis weight as no facing materials are used in the personal care product. Further, the thermoplastic elastomeric film layers have improved poke-through performance. As used herein, "poke-through performance" generally refers to the durability or toughness of a film to resist tearing of the film layer during use, such as the ability of the film layer to resist a user poking through the film layer with his finger.

Exemplary styrenic block copolymers for use with the thermoplastic elastomers include hydrogenated polyisoprene polymers such as styrene-ethylenepropylene-styrene (SEPS), styrene-ethylenepropylene-styrene-ethylenepropylene (SEPSEP), hydrogenated polybutadiene polymers such as styrene-ethylenebutylene-styrene (SEBS), styrene-ethylenebutylene-styrene-ethylenebutylene (SEBSEB), styrene-butadiene-styrene (SBS), styrene-isoprene-styrene (SIS), styrene-isoprene-butadiene-styrene (SIBS), hydrogenated poly-isoprene/butadiene polymer such as styrene-ethylene-ethylenepropylene-styrene (SEEPS), and hydrogenated vinyl-polyisoprene/hydrogenated polyisoprene/polystyrene triblock polymers such as commercially available as HYBRAR™ 7311 (Kuraray America, Inc., Houston, Tex.), and combinations thereof. Polymer block configurations such as diblock, triblock, multiblock, star and radial are also contemplated in this disclosure. In some instances, higher molecular weight block copolymers may be desirable. Block copolymers are available from Kraton Polymers U.S. LLC of Houston, Tex. under the designations, for example, Kraton MD6716, Kraton D1102, Kraton SIBS D1102, Kraton D1184, Kraton FG1901, and Kraton FG1924, and Septon Company of America, Pasadena, Tex. under the designations Septon 8007, Septon V9827, and Septon 9618. Another potential supplier of such polymers includes Dynasol of Spain. In particular, Kraton MD6716 SEBS triblock polymer is particularly suitable for the present disclosure.

The thermoplastic elastomeric film layers may generally include from about 15% to about 40% by weight styrenic block copolymer, including about 30% by weight styrenic block copolymer.

Surprisingly, the thermoplastic elastomeric film layers for use in the elastic laminates of the present disclosure have a tensile strength that is 40% to about 100% greater than a thermoplastic elastomeric film layer without a styrenic block copolymer. In some embodiments, the film layers have a tensile strength that is from about 50% to about 80% greater than a thermoplastic elastomeric film layer without a styrenic block copolymer.

In particularly suitable embodiments, to further improve the strength of the thermoplastic elastomeric film layers, the films may additionally include a strength enhancing agent. As used herein, "strength enhancing agent" refers to a physically compounded master batch or blend of organic polymers and up to 60% by weight inorganic particles, which can reinforce the blends of thermoplastic elastomer and styrenic block copolymer or make a stronger thermoplastic elastomeric film layer in terms of increased tensile strength at break with a lower elongation at break without compromised elastic properties in terms of hysteresis and permanent set after 150% elongation.

Suitable strength enhancing agents include inorganic clays, and in suitable embodiments, include, for example, polymer grade montmorillonites, which are high purity aluminosilicate minerals referred to as phyllosilicates. Montmorillonites have a sheet-like or plate-like structure. Although their dimensions in the length and width directions can be measured in hundreds of nanometers, the mineral's thickness is only one nanometer. As a result, individual sheets have aspect ratios (length/width (l/w) or thickness/diameter (t/d)) varying from about 200 to about 1000, and in particularly suitable embodiments, from about 200 to about 400.

In some embodiments, the strength enhancing agents are inorganic clay particles such as Nanocor I.44P (available from Nanocor, Hoffman Estates, Ill.) having an average particle size of less than 20 microns in diameter, including from about 10 microns to about 15 microns in diameter, and in particularly suitably embodiments, are about 13 microns in diameter. In other embodiments, the strength enhancing agents are blends of inorganic clay and propylene such as Nanocor PP master batch (available from Nanocor, Hoffman Estates, Ill.).

The thermoplastic elastomeric film layers may generally include from about 2% to about 10% by weight strength enhancing agent, including from about 3% to about 8% by weight, and including from about 3% to about 5% by weight strength enhancing agent.

The thermoplastic elastomeric film layers may further include processing aids and or tackifiers associated with the elastomer polymers as known in the film-making art.

In some embodiments, the thermoplastic elastomeric film layers may be substantially free of calcium carbonate. In this context, and unless otherwise specified, the term "substantially free" means that the thermoplastic elastomeric film layers contain less than a functional amount of calcium carbonate, typically less than 1%, including less than 0.5%, including less than 0.1%, including less than 0.05%, including less than 0.015%, including less than 0.001%, and also including zero percent, by total weight of the thermoplastic elastomeric film layer.

In some embodiments, as these thermoplastic elastomeric film layers are substantially free of filler particles such as calcium carbonate, the films are air impermeable. It should be understood however, in alternative embodiments, the film layers can be prepared to be breathable.

The thermoplastic elastomeric film layers used in the elastic laminates have a permanent set, after 150% elongation, of less than 40%, including a permanent set, after 150% elongation, of less than 30%, and including a permanent set, after 150% elongation, of less than 20%.

The elastic laminates of the present disclosure further include at least one plastic layer. The plastic layer of the elastic laminates includes semi-crystalline or amorphous polymers. Suitable semi-crystalline polymers for use in the plastic layers include polyolefin, polyolefin-based copolymers, polyesters, and combinations thereof.

Suitably, the plastic layers include from about 5% by weight to about 50% by weight of semi-crystalline or amorphous polymer, including from about 10% by weight to about 40% by weight of semi-crystalline or amorphous polymer, and including from about 15% by weight to about 35% by weight of semi-crystalline or amorphous polymer.

It should be understood that to provide the advantageous physical properties of the elastic laminates of the present disclosure, the plastic layer should have a greater permanent set than the thermoplastic elastomeric film layer of the elastic laminate. Accordingly, the plastic layers for use in the elastic laminates of the present disclosure include a permanent set after 150% elongation of greater than 50%, including greater than 75%, and including greater than 90%.

To prepare the elastic laminates of the present disclosure, the thermoplastic elastomeric film layers are coextruded with the plastic layers. Coextruding of the materials can be accomplished using any extrusion means known in the lamination arts.

Once extruded, the elastic laminate is initially stretched in either the machine direction (MD) or cross direction (CD). Typically, the laminate is stretched from about 100% to about 600%, including from about 200% to about 500%, of its natural state. After stretching, the elastic laminate is allowed to relax back to, or close to, its natural state.

Through the stretching/relaxation process of the laminate, the plastic layer of the laminate is elongated by initial stretching and then corrugated by relaxation of the elastomeric film. Because the plastic layer is corrugated by initial stretching and relaxing of the laminate, modulus and tensile stress of the laminate is mainly dominated by the elastomeric film layer, keeping sufficient elasticity as well as low tensile stress until it is stretched to a strain range where the corrugated plastic layer becomes flat.

a gauge length of 1 inch using a MTS tensile machine with 50N load cell.

Permanent set was measured after 150% elongation cycle according to EQ-STM-00201, using the same specimen dimensions and tensile machine as the physical tensile properties above. The results are shown in Table 1.

TABLE 1

| Film Composition | | | Component Fraction | | | Physical Properties | | |
|---|---|---|---|---|---|---|---|---|
| | | | | | | Film Thickness | Elongation at Break | Tensile Strength | Permanent Set after 150% elongation |
| 1 | 2 | 3 | 1 % | 2 % | 3 % | Mm | % | MPa | % |
| VISTAMAXX™ 6102FL | — | — | 100 | — | — | 0.07 | 777.48 | 15.96 | 15.5 |
| VISTAMAXX™ 6102FL | Kraton MD6716 | — | 70 | 30 | — | 0.063 | 725.61 | 19.55 | 16.6 |
| VISTAMAXX™ 6102FL | Kraton MD6716 | Clay | 67 | 30 | 3 | 0.074 | 752.4 | 23.71 | 18.6 |

As noted above, once the plastic layer is elongated further than its initial stretching strain level, increased tensile strength is generated due to the molecular orientation and tension hardening of the plastic layer. Particularly, it has been discovered that the elastic laminates of the present disclosure have final strength at break 50-100% greater than the thermoplastic elastomeric film used alone.

Figure 1:
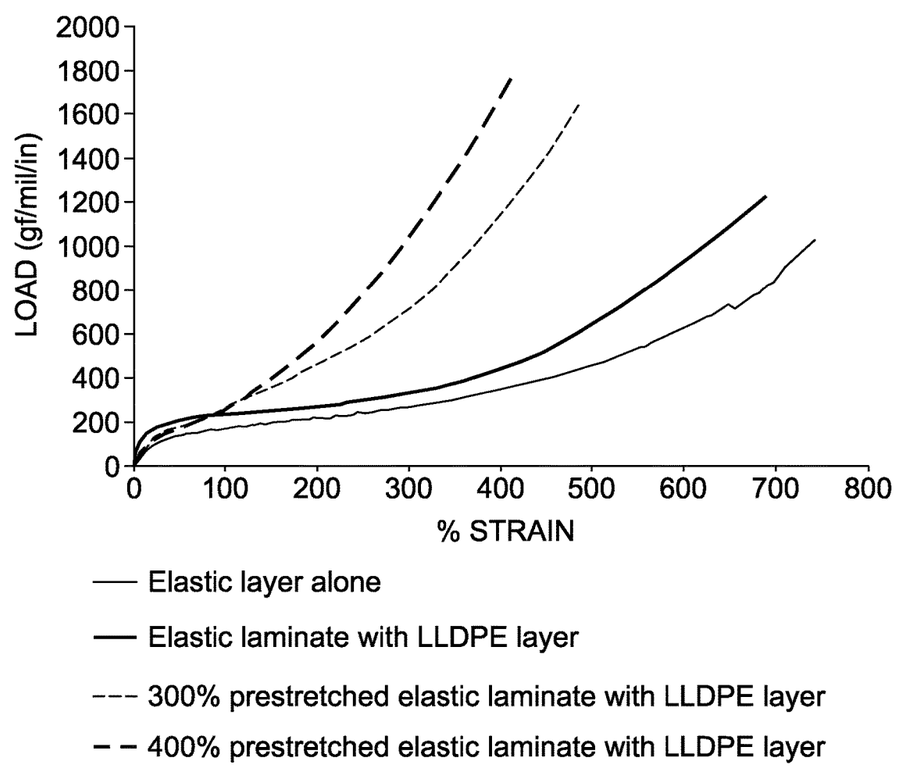
FIG. 1 depicts a stress-strain curve for an elastomeric film layer, an elastic laminate made from the elastomeric film layer affixed to a linear low density polyethylene (LLDPE) layer, and an elastic laminate made from the elastomeric film layer affixed to a LLDPE layer that has been initially stretched 300% and 400% in the machine direction and allowed to relax.

Further, by initial stretching and relaxation of the elastic laminate, the strain-stress curve can be shifted to a lower strain region, such as shown in FIG. 1.

Having described the disclosure in detail, it will be apparent that modifications and variations are possible without departing from the scope of the disclosure defined in the appended claims.

EXAMPLE

The following non-limiting Examples are provided to further illustrate the present disclosure.

Example 1

In this Example, various thermoplastic elastomeric films were prepared and evaluated for their physical properties, including stress-strain tensile behavior, elongation at break, and permanent set after 150% elongation.

Single layer films were produced by dry blending VISTAMAXX™ 6102 FL, a propylene-based thermoplastic elastomer available from Exxon Mobil, Houston, Tex.; Kraton MD6716, a styrene block copolymer available from Kraton Polymers, Houston Tex.; and, in some samples, Nanocor I.44P clay particles having any average size of about 13 μm, available from Nanocor, Hoffman Estates, Ill. The resulting mixture was fed into a 1.5" Trinity II Killion Extruder (Killion Industries, Vista, Calif.) with a temperature profile set to 185-200° C. The molten polymers were then fed into a 20-inch film die and collected with the chill roll set at 10° C. and a take-up speed of 6-10 feet per minute (fpm), which resulted in a film thickness of 0.06-0.11 mm.

The physical tensile properties of the film layers were then tested according to ASTM D882. Particularly, samples were cut in the machine direction using a 101.6 mm×9.525 mm (4"×⅜") die and tensile properties were measured with As shown in Table 1, blending with styrene block copolymer increased tensile strength from 15.96 MPa to 19.55 MPa. With 3% clay additive in the blended elastomeric film, there was further enhanced tensile strength to 23.71 MPa. Permanent set was slightly increased with blending styrene block copolymer or styrene block copolymer and clay, but still showed reasonable elasticity, showing less than 20% permanent set after 150% elongation.

Example 2

In this Example, various thermoplastic elastomeric laminates were prepared and evaluated for physical properties, including stress-strain tensile behavior, elongation at break, and permanent set after 150% elongation.

Multi-layer film laminates were produced using a coextrusion system. To prepare the inner core thermoplastic elastomeric film layer, resins including VISTAMAXX™ 6102 FL, a propylene-based thermoplastic elastomer available from Exxon Mobil, Houston, Tex.; and Kraton MD6716, a styrene block copolymer available from Kraton Polymers, Houston Tex., were dry blended. The resulting mixture was fed into a 1.5" Trinity II Killion Extruder (Killion Industries, Vista, Calif.) with a temperature profile set to 185-200° C. Simultaneously, the outer plastic layers (top and bottom layers) were prepared by feeding one of Dowlex 2035, a linear low density polyethylene available from Dow Chemical, Midland, Mich., HD6719, a high density polyethylene available from Exxon Mobil, Houston, Tex., and M3661, a polypropylene available from Total Petrochemical, Houston, Tex., into a 1.25" B Killion Extruder (Killion Industries, Vista, Calif.) with a temperature profile of 170-200° C. The three-layer molten polymers were coextruded through a 20-inch film die and collected with the chill roll set at 10° C. and a take-up speed of 6-10 feet per minute (fpm), which resulted in a film thickness of 0.06-0.11 mm.

Some laminate samples were pre-stretched by stretching a 3"×6" sample to 300 and 400% strain with a gauge length of 3 inches followed by relaxation using a MTS tensile machine. The samples were then cut into the same specimen size and physical properties measured as described in Example 1 above. The results are shown in Table 2.

TABLE 2

| Film composition | | | Component fraction | | | | | Physical properties | | |
|---|---|---|---|---|---|---|---|---|---|---|
| | | skin | inner layer (%) | | skin layer | | Film | Elongation | Tensile | Permanent set after 150% |
| Inner layer | | layer | | | (%) | Prestretching | Thickness | @ Break | strength | elongation |
| 1 | 2 | 1 | (%) 1 | (%) 2 | 1 (%) | (%) | (mm) | (%) | (Mpa) | (%) |
| Vistamaxx 6102FL | Kraton MD6716 | — | 100 70 | 30 | — | 0 | 0.063 | 725.61 | 19.55 | 16.6 |
| Vistamaxx 6102FL | Kraton MD6716 | Dowlex 2035 | 80 70 | 20 30 | 100 | 0 | 0.123 | 854.7 | 21.73 | 26.8 |
| Vistamaxx 6102FL | Kraton MD6716 | Dowlex 2035 | 80 70 | 20 30 | 100 | 300 | 0.109 | 601.5 | 34.12 | 16 |
| Vistamaxx 6102FL | Kraton MD6716 | Dowlex 2035 | 80 70 | 20 30 | 100 | 400 | 0.103 | 528.4 | 37.72 | 16.1 |
| Vistamaxx 6102FL | Kraton MD6716 | HD6719 | 80 70 | 20 30 | 100 | 0 | 0.135 | 887.9 | 19.69 | 48 |
| Vistamaxx 6102FL | Kraton MD6716 | HD6719 | 80 70 | 20 30 | 100 | 300 | 0.106 | 648.4 | 38.04 | 23.5 |
| Vistamaxx 6102FL | Kraton MD6716 | HD6719 | 80 70 | 20 30 | 100 | 400 | 0.106 | 579.9 | 37.28 | 23 |
| Vistamaxx 6102FL | Kraton MD6716 | M3661 | 80 70 | 20 30 | 100 | 0 | 0.144 | 930.7 | 22.68 | 63.1 |
| Vistamaxx 6102FL | Kraton MD6716 | M3661 | 80 70 | 20 30 | 100 | 300 | 0.1 | 461.5 | 46.84 | 28.1 |
| Vistamaxx 6102FL | Kraton MD6716 | M3661 | 80 70 | 20 30 | 100 | 400 | 0.104 | 448.3 | 50.27 | 23.6 |

As shown in Table 2, the addition of the outer plastic layers effectively enhanced overall tensile strength, but increased permanent set. This indicates that the plastic layers were less elastic than the elastomeric film layers alone. However, by prestretching, the overall physical properties of the three-layer laminates were enhanced such to be suitable for use in absorbent articles. Particularly, tensile strength was dramatically enhanced; permanent set after 150% elongation was effectively reduced, meaning better elastic behavior; and elongation at break was dramatically reduced, meaning that stretch to stop range was effectively shortened.

Example 3

In this Example, various thermoplastic elastomeric laminates were prepared and evaluated for physical properties, including stress-strain tensile behavior, elongation at break, and permanent set after 150% elongation, as in Example 2 with the exceptions that the elastomeric film layer contains an additional 3% by weight of a strengthening agent (Nanocor I.44P clay particles having an average size of about 13 μm, available from Nanocor, Hoffman Estates, Ill.) and the plastic layers of the instant Example were prepared from Escorene Ultra LC 706.15, an ethylene vinyl acetate copolymer available from ExxonMobil, Houston, Tex. The results are shown in Table 3.

TABLE 3

| Film composition | | | | Component fraction | | | | | | Physical properties | | |
|---|---|---|---|---|---|---|---|---|---|---|---|---|
| | | | skin | inner layer (%) | | | skin layer | | Film | Elongation | Tensile | Permanent set after 150% |
| Inner layer | | | layer | | | | (%) | Prestretching | Thickness | @ Break | strength | elongation |
| 1 | 2 | 3 | 1 | (%) 1 | (%) 2 | (%) 3 | 1 (%) | (%) | (mm) | (%) | (Mpa) | (%) |
| Vistamaxx 6102FL | Kraton MD6716 | Clay | — | 100 67 | 30 | 3 | — | 0 | 0.074 | 752.4 | 23.71 | 18.6 |
| Vistamaxx 6102FL | Kraton MD6716 | Clay | Escorene LD 706.15 | 85 67 | 15 30 | 3 | 100 | 0 | 0.056 | 824.4 | 27.59 | 24.5 |
| Vistamaxx 6102FL | Kraton MD6716 | Clay | Escorene LD 706.15 | 85 67 | 15 30 | 3 | 100 | 400 | 0.044 | 660.3 | 33.2 | 11.3 |
| Vistamaxx 6102FL | Kraton MD6716 | Clay | Escorene LD 706.15 | 75 67 | 25 30 | 3 | 100 | 0 | 0.067 | 888.66 | 28.4 | 28.2 |

TABLE 3-continued

| Film composition | | | | Component fraction | | | | | Physical properties | | | |
|---|---|---|---|---|---|---|---|---|---|---|---|---|
| | | | | inner layer (%) | | | skin layer | | | Elongation | Tensile | Permanent set after 150% |
| Inner layer | | | skin layer | | | | | Prestretching | Film Thickness | @ Break | strength | elongation |
| 1 | 2 | 3 | 1 | (%) | (%) | (%) | 1 (%) | (%) | (mm) | (%) | (Mpa) | (%) |
| Vistamaxx 6102FL | Kraton MD6716 | Clay | Escorene LD 706.15 | 67 | 75 30 | 3 | 25 100 | 300 | 0.083 | 727.6 | 28.5 | 12.1 |
| Vistamaxx 6102FL | Kraton MD6716 | Clay | Escorene LD 706.15 | 67 | 75 30 | 3 | 25 100 | 400 | 0.056 | 626.1 | 29.35 | 11.9 |
| Vistamaxx 6102FL | Kraton MD6716 | Clay | Escorene LD 706.15 | 67 | 65 30 | 3 | 35 100 | 0 | 0.66 | 909.4 | 29.2 | 31.4 |
| Vistamaxx 6102FL | Kraton MD6716 | Clay | Escorene LD 706.15 | 67 | 65 30 | 3 | 35 100 | 300 | 0.55 | 674.4 | 31.75 | 14.4 |
| Vistamaxx 6102FL | Kraton MD6716 | Clay | Escorene LD 706.15 | 67 | 65 30 | 3 | 35 100 | 400 | 0.089 | 702.5 | 34.61 | 12.8 |

As shown in Table 3, similar physical behavior was seen as that found in Example 2 with the exception that the elastomeric film core layer had 3% clay. The addition of the Escorene Ultra LC 706.15 plastic layers enhanced tensile strength effectively, but higher permanent set was found. By prestretching, however, the physical properties such as tensile strength, permanent set, and elongation at break were enhanced similar to that seen in Example 2.

Example 4

In this Example, various thermoplastic elastomeric laminates were prepared and evaluated for physical properties, including stress-strain tensile behavior, elongation at break, and permanent set after 150% elongation, as in Example 2 with the exception that the plastic layers of the instant Example were prepared from either Dowlex 2035, which is a linear low density polyethylene commercially available from Dow Chemical (Midland, Mich.) or M3661, which is a polypropylene commercially available from Total Petrochemical (Houston, Tex.). The results are shown in Table 4.

TABLE 4

| Film composition | | | | Component fraction | | | | | | Physical properties | | |
|---|---|---|---|---|---|---|---|---|---|---|---|---|
| | | | | inner layer (%) | | | skin layer | | | Elongation | Tensile | Permanent set after 150% |
| Inner layer | | | skin layer | | | | | Prestretching | Film Thickness | @ Break | strength | elongation |
| 1 | 2 | 3 | 1 | (%) | (%) | (%) | 1 (%) | (%) | (mm) | (%) | (Mpa) | (%) |
| Vistamaxx 6102FL | Kraton MD6716 | Clay | — | 67 | 100 30 | 3 | — | 0 | 0.074 | 752.4 | 23.71 | 18.6 |
| Vistamaxx 6102FL | Kraton MD6716 | Clay | Dowlex 2035 | 67 | 80 30 | 3 | 20 100 | 0 | 0.110 | 971.7 | 25.05 | 21.2 |
| Vistamaxx 6102FL | Kraton MD6716 | Clay | Dowlex 2035 | 67 | 80 30 | 3 | 20 100 | 400 | 0.112 | 773.1 | 36.99 | 14.2 |
| Vistamaxx 6102FL | Kraton MD6716 | Clay | Dowlex 2035 | 67 | 65 30 | 3 | 35 100 | 0 | 0.107 | 895.8 | 26.31 | 23.8 |
| Vistamaxx 6102FL | Kraton MD6716 | Clay | Dowlex 2035 | 67 | 65 30 | 3 | 35 100 | 400 | 0.112 | 652.3 | 35.51 | 14.7 |
| Vistamaxx 6102FL | Kraton MD6716 | Clay | M3661 | 67 | 80 30 | 3 | 20 100 | 0 | 0.110 | 859.1 | 23.52 | 29.0 |
| Vistamaxx 6102FL | Kraton MD6716 | Clay | M3661 | 67 | 80 30 | 3 | 20 100 | 400 | 0.128 | 566.7 | 29.98 | 21.4 |
| Vistamaxx 6102FL | Kraton MD6716 | Clay | M3661 | 67 | 65 30 | 3 | 35 100 | 0 | 0.111 | 927.8 | 25.56 | 52.5 |
| Vistamaxx 6102FL | Kraton MD6716 | Clay | M3661 | 67 | 65 30 | 3 | 35 100 | 400 | 0.132 | 470.2 | 29.67 | 26.9 |

As shown in Table 4, similar to Example 3, the addition of the plastic layers enhanced tensile strength effectively, but higher permanent set was found. By prestretching, however, all the physical properties were enhanced similar to that seen in Example 2.

What is claimed is:

1. An elastic laminate comprising:
a first thermoplastic elastomeric film layer configured to have a permanent set of less than 40% after 150% elongation, wherein the thermoplastic elastomeric film layer comprises greater than 65% by weight polyolefin-based thermoplastic elastomer, a styrenic block copolymer, and from about 3% by weight to about 8% by weight strength-enhancing agent; and
a first plastic layer affixed to a first surface of the thermoplastic elastomeric film layer, the plastic layer having a permanent set greater than the permanent set of the elastomeric film layer, and wherein the plastic layer comprises one of a semi-crystalline and amorphous polymer;
wherein the laminate is pre-stretched.

2. The elastic laminate as set forth in claim 1, wherein the polyolefin-based thermoplastic elastomer comprises at least one of an ethylene homopolymer, an ethylene copolymer, a propylene homopolymer, a propylene copolymer, a propylene block copolymer, a butene homopolymer, a butene copolymer, a methylpentene homopolymer, a methylpentene copolymer and combinations thereof.

3. The elastic laminate as set forth in claim 1, wherein the styrenic block copolymer is selected from the group consisting of styrene-ethylenepropylene-styrene (SEPS), styrene-ethylenepropylene-styrene-ethylenepropylene (SEP-SEP), styrene-ethylenebutylene-styrene (SEBS), styrene-ethylenebutylene-styrene-ethylenebutylene (SEBSEB), styrene-butadiene-styrene (SBS), styrene-isoprene-styrene (SIS), styrene-isoprene-butadiene-styrene (SIBS), styrene-ethylene-ethylenepropylene-styrene (SEEPS), hydrogenated vinyl-polyisoprene/hydrogenated polyisoprene/polystyrene and combinations thereof.

4. The elastic laminate as set forth in claim 1, wherein the strength-enhancing agent is inorganic clay.

5. The elastic laminate as set forth in claim 1, wherein the thermoplastic elastomeric film layer comprises from about 15% by weight to about 30% by weight styrenic block copolymer.

6. The elastic laminate as set forth in claim 1, wherein the thermoplastic elastomeric film layer is substantially free of calcium carbonate.

7. The elastic laminate as set forth in claim 1, wherein the semi-crystalline or amorphous polymer is selected from the group consisting of polyolefins, polyolefin-based copolymers, polyesters, and combinations thereof.

8. The elastic laminate as set forth in claim 1, wherein the plastic layer comprises from about 5% by weight to about 50% by weight semi-crystalline or amorphous polymer.

9. The elastic laminate as set forth in claim 1, wherein the thermoplastic elastomeric film layer is air impermeable.

10. The elastic laminate as set forth in claim 1 further comprising a second plastic layer affixed to a second surface of the thermoplastic elastomeric film layer.

11. The elastic laminate as set forth in claim 1 further comprising a second thermoplastic elastomeric film layer, wherein the second thermoplastic elastomeric film layer is affixed to the first plastic layer opposite the first thermoplastic elastomeric film layer.

12. A method for preparing an elastic laminate, the method comprising:
coextruding a first thermoplastic elastomeric film layer with a first plastic layer to prepare an elastic laminate, the first thermoplastic film layer configured to have a permanent set of less than 40% after 150% elongation, wherein the thermoplastic elastomeric film layer comprises greater than 65% by weight polyolefin-based thermoplastic elastomer, a styrenic block copolymer, and from about 3% by weight to about 8% by weight strength-enhancing agent; the plastic layer having a permanent set greater than the permanent set of the elastomeric film layer, and wherein the plastic layer comprises one of a semi-crystalline or amorphous polymer;
stretching the elastic laminate in one or both of the machine direction or cross direction; and
relaxing the stretched elastic laminate.

13. The method as set forth in claim 12, wherein the polyolefin-based thermoplastic elastomer comprises at least one of an ethylene homopolymer, an ethylene copolymer, a propylene homopolymer, a propylene copolymer, a propylene block copolymer, a butene homopolymer, a butene copolymer, a methylpentene homopolymer, a methylpentene copolymer and combinations thereof.

14. The method as set forth in claim 12, wherein the styrenic block copolymer is selected from the group consisting of styrene-ethylenepropylene-styrene (SEPS), styrene-ethylenepropylene-styrene-ethylenepropylene (SEP-SEP), styrene-ethylenebutylene-styrene (SEBS), styrene-ethylenebutylene-styrene-ethylenebutylene (SEBSEB), styrene-butadiene-styrene (SBS), styrene-isoprene-styrene (SIS), styrene-isoprene-butadiene-styrene (SIBS), styrene-ethylene-ethylenepropylene-styrene (SEEPS), hydrogenated vinyl-polyisoprene/hydrogenated polyisoprene/polystyrene and combinations thereof.

15. The method as set forth in claim 12, wherein the strength-enhancing agent is inorganic clay.

16. The method as set forth in claim 12, wherein the thermoplastic elastomeric film layer comprises from about 15% by weight to about 30% by weight styrenic block copolymer.

17. The method as set forth in claim 12, wherein the semi-crystalline or amorphous polymer is selected from the group consisting of polyolefins, polyolefin-based copolymers, polyesters, and combinations thereof.

18. The method as set forth in claim 12, wherein the elastomeric laminate is stretched from about 100% to about 600% in the machine direction or cross direction.

19. The method as set forth in claim 12 further comprising coextruding a second plastic layer with the first thermoplastic elastomeric film layer opposite the first plastic layer, the second plastic layer comprising one of a semi-crystalline or amorphous polymer.

20. The method as set forth in claim 12 further comprising coextruding a second thermoplastic elastomeric film layer with the first plastic layer opposite the first thermoplastic elastomeric film layer.

* * * * *